United States Patent [19]
Roof et al.

[11] Patent Number: 5,201,579
[45] Date of Patent: Apr. 13, 1993

[54] LAMP HOUSING MOUNTING ARRANGEMENT

[75] Inventors: James A. Roof, West Bloomfield; Kenneth J. Foley, Sterling Heights, both of Mich.

[73] Assignee: General Motors Corporation, Detroit, Mich.

[21] Appl. No.: 859,793

[22] Filed: Mar. 30, 1992

Related U.S. Application Data

[63] Continuation-in-part of Ser. No. 741,019, Aug. 6, 1991, abandoned.

[51] Int. Cl.⁵ .............................................. B60Q 1/00
[52] U.S. Cl. ....................................... 362/368; 362/80; 362/80.1; 362/370
[58] Field of Search ................. 362/80, 80.1, 83, 83.3, 362/368, 369, 370, 371, 374, 375, 382, 430; 296/185; 248/231.9, 223.4, 224.4, 500, 510

[56] References Cited

U.S. PATENT DOCUMENTS

| | | | |
|---|---|---|---|
| 3,656,105 | 4/1972 | Steltzer et al. | 340/119 |
| 4,831,501 | 5/1989 | Okamoto et al. | 362/61 |
| 4,945,456 | 7/1990 | Kakidaira | 362/80.1 |

FOREIGN PATENT DOCUMENTS

63-235139  9/1988  Japan.

Primary Examiner—Ira S. Lazarus
Assistant Examiner—Y. Quach
Attorney, Agent, or Firm—Edward J. Biskup

[57] ABSTRACT

A mounting arrangement for a vehicle lamp housing which includes an integral hold-down member having a lock arm cooperating with a pawl formed on a support panel and also having a contact foot insertable into a slot adjacent the pawl for locking the lamp housing to the support panel.

10 Claims, 6 Drawing Sheets

FIG. 14

LAMP HOUSING MOUNTING ARRANGEMENT

This is a continuation-in-part of application Ser. No. 07/741,019 filed on Aug. 6, 1991 now abandoned.

This invention concerns lamp housings and more particularly pertains to a mounting arrangement for fastening a lamp housing to a support panel.

Lamp housings, such as used in automobiles for the center high mounted stop lights (CHMSL), are normally secured to the support panel adjacent the rear window or backlite by a plurality of threaded fasteners. In order to simplify and expedite the mounting of the CHMSL to the support panel during the manufacture of the automobile, we propose having the fastener portion be a part of the lamp housing and have such fastener portion cooperate with suitable slot means and detent means formed in the support panel so that mounting of the housing can be facilitated without the need for threaded or other forms of separate fastening means.

To this end, the present invention concerns a mounting arrangement for connecting a lamp housing to a support panel formed with an elongated slot one part of which includes an access portion and another part of which serves as a retainer portion. A pawl is provided in the support panel adjacent the slot and a hold-down member is provided as a part of the housing and cooperates with the slot and the pawl for maintaining the lamp housing in a fixed position relative to the support panel. More specifically, the hold-down member includes a body portion fixed with and extending outwardly from the lamp housing. The body portion is formed with a centrally located opening and has a lock arm positioned with one end thereof connected to the body portion by a hinge means which biases the lock arm towards the support panel. A plurality of ratchet teeth are formed on the lock arm for engagement with the pawl and the lock arm is formed with a release means for moving the lock arm in a direction against the bias of the hinge means for releasing the ratchet teeth from the pawl. An insert member is connected to the body portion and includes a vertically orientated leg depending from the body portion and terminating with a horizontally orientated contact foot so as to allow the contact foot to be initially inserted through the access portion of the slot after which the lamp housing together with the hold-down member is shifted bodily towards the retainer portion of the slot whereupon the ratchet teeth of the lock arm engage the pawl and the contact foot engages the underside of the support panel to lock the lamp housing in position.

The objects of the present invention are to provide a new and improved mounting arrangement for a lamp housing that permits the latter to be quickly and easily fastened to a support panel without the use of any tools and is characterized in that the fastening means is formed so it can be a part of the lamp housing and includes ratchet teeth which allow adjustment of the position of the housing when fastened to the support panel; to provide a new and improved mounting arrangement for a vehicle lamp housing which includes an integral hold-down member provided with a lock arm cooperating with a pawl formed on a support panel and also has a contact foot insertable into a slot adjacent the pawl for locking the lamp housing to the support panel; to provide a new and improved lamp housing provided with a hold-down member having a lock arm formed with ratchet teeth and having a depending contact foot which jointly cooperate with a pawl and a slot formed in a support panel for fastening the lamp housing to the support panel by inserting the contact foot into the slot followed by a shifting movement of the lamp housing into another area of the slot; and to provide a new and improved lamp housing for a vehicle that can be quickly and easily fastened to a support panel provided with a retainer slot and a pawl which is located adjacent thereto and that utilizes a cantilevered lock arm having ratchet teeth normally biased into engagement with the pawl and an insert member which is adapted to extend into the slot and cooperate with the lock arm for releasably maintaining the lamp housing in a fixed position on the support panel.

Other objects and advantages of the present invention will be apparent from the following detailed description when taken with the drawings in which.

Figure 1:
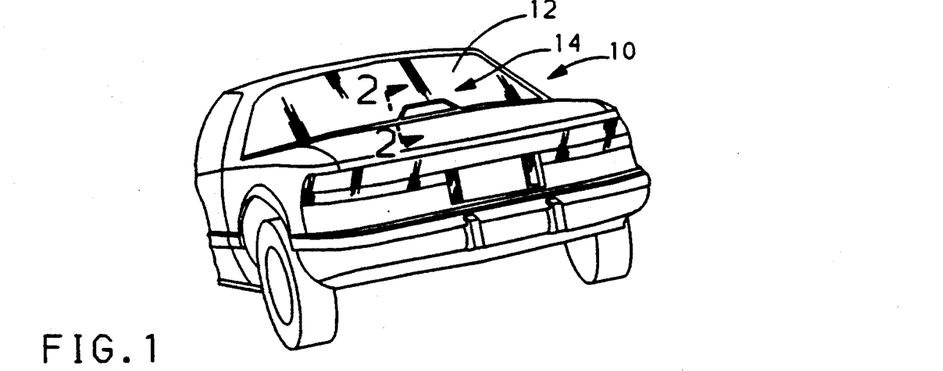
FIG. 1 is a perspective view of the rear end of a motor vehicle incorporating a mounting arrangement in accordance with the present invention for fastening the lamp housing of a center high mounted stop light to a support panel.
Figure 2:
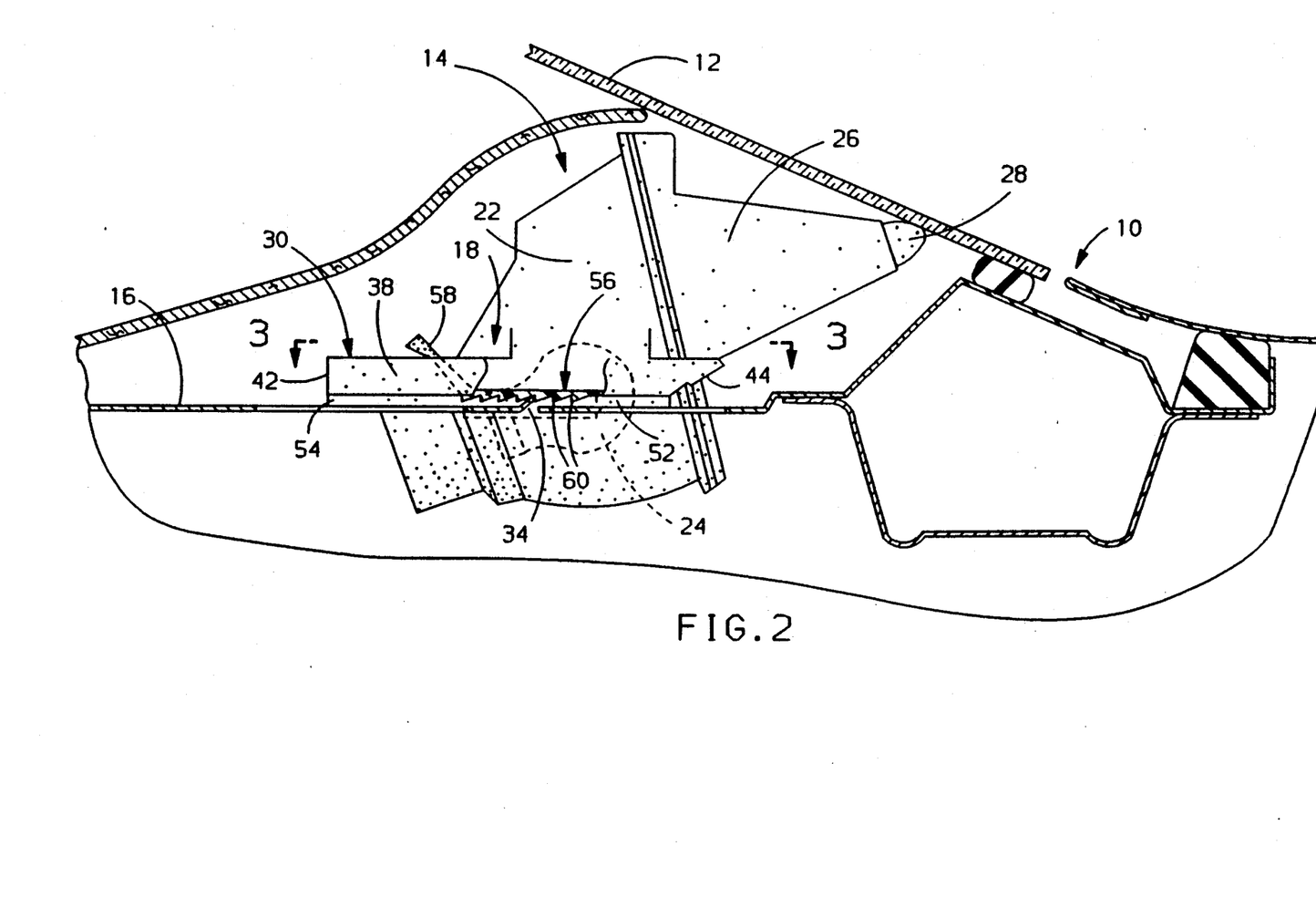
FIG. 2 is an enlarged elevational view of the mounting arrangement taken on line 2—2 of FIG. 1 and shows a hold-down member formed with the lamp housing and cooperating with a pawl formed in the support panel for maintaining the lamp housing in a fixed position.

Referring now to the drawings and more particularly FIGS. 1 and 2 thereof, the rear end of a motor vehicle 10 is shown having the usual backlite 12 behind which is provided a center high mounted stop light 14. As best seen in FIG. 2, the stop light 14 is secured to a sheet metal support panel 16 by a pair of mounting arrangements 18 and 20 each of which is made in accordance with the present invention and seen in FIG. 3.

Figure 3:
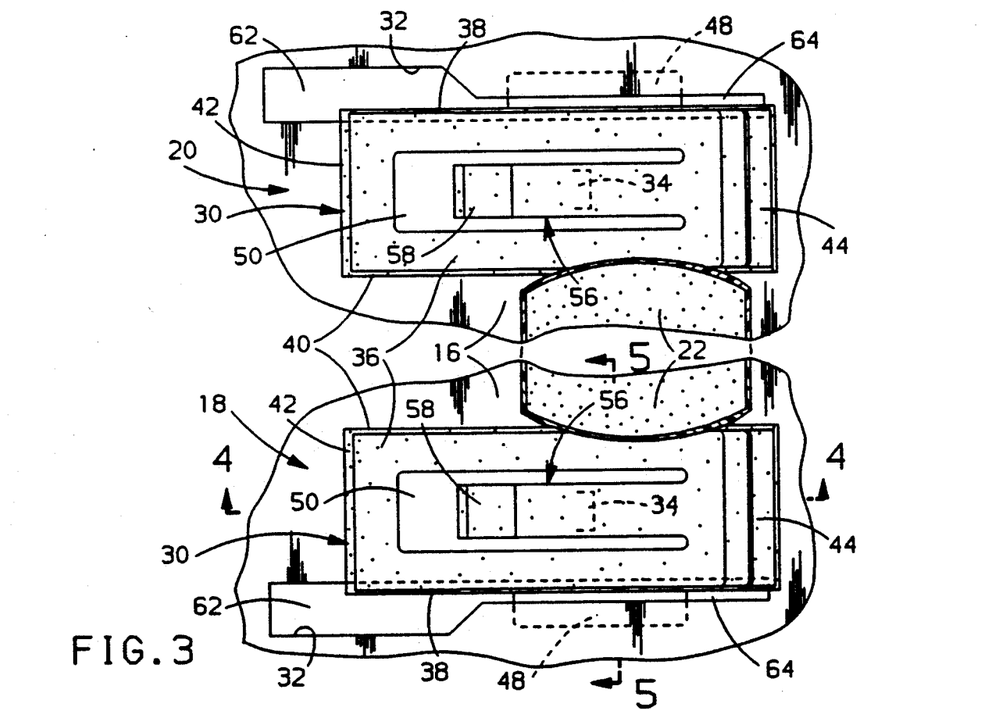
FIG. 3 is a plan view taken on line 3—3 of FIG. 2 but with the lamp housing removed and shows the hold-down member as an integral part of the lamp housing.

More specifically, as seen in FIG. 2, the stop light 14 includes a lamp housing or reflector member 22 made of a plastic material and provided with a light bulb 24. The front open end of the lamp housing 22 is closed by a lens member 26 which terminates with a bumper member 28 adapted to abut the inner lower surface of the backlite 12 when the stop light 14 is in the operative position. The lamp housing 22 is maintained in the disclosed abutting position relative to the backlite 12 by the pair of mounting arrangements 18 and 20 each of which, in the preferred form, includes a hold-down member 30 which cooperates with a retainer slot 32 and pawl 34 formed in the support panel 16. In the case of the stop light 14 shown in FIG. 2, the mounting arrangements 18 and 20 provided are mirror images of each other. Thus, as best seen in FIG. 3, each of the hold-down members 18 and 20 is integrally formed with one side of the lamp housing 22 and extends laterally outwardly therefrom and cooperates with the associated retainer slot 32 and pawl 34 formed in the support panel 16 for securing the lamp housing 22 in the position shown. It will be understood, however, that rather than having a pair of mounting arrangements on opposed sides of the lamp housing 22 as shown, if desired, a single mounting arrangement could be used for securing the lamp housing 22 to the support panel 16 by placing it centrally behind the lamp housing 22.

Figure 4:
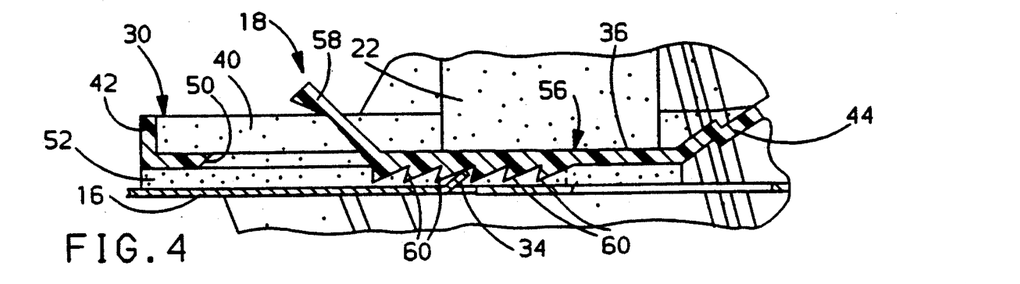
FIG. 4 is an enlarged view of the mounting arrangement taken on line 4—4 of FIG. 3 and illustrates in detail the various parts of the mounting arrangement.
Figure 5:
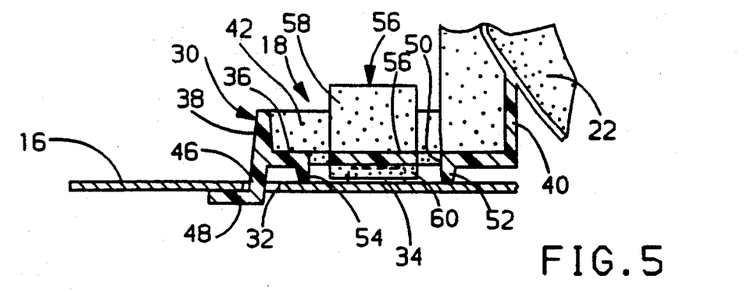
FIG. 5 is an enlarged view of the mounting arrangement taken on line 5—5 of FIG. 3.

As seen in FIGS. 3, 4 and 5, each hold-down member 30 which is part of the mounting arrangements 18 and 20 and forms an integral part of the lamp housing 22 includes a generally rectangular body portion. The body portion of each hold-down member 30 includes a planar base 36 formed with a pair of laterally spaced side walls 38 and 40 and a pair of end walls 42 and 44. The outboard side wall 38 is formed with an insert member that extends downwardly therefrom and comprises a vertically orientated leg 46 and a horizontally laterally outwardly extending contact foot 48. A rectangular opening 50 is provided in the base 36 and is bounded on the opposed sides thereof by a pair of depending and identical spacer elements 52 and 54 integrally formed with the lower surface of the base 36 as seen in FIG. 5. A lock arm 56 is positioned in the opening 50 with one end of the lock arm 56 connected to the base in a manner so as to provide, in effect, a resilient hinge which continually biases the lock arm 56 towards the support panel 16. The other or free end of the lock arm is formed with a release handle 58 which extends upwardly from the opening 50 and is accessible for purposes which will be explained hereinafter. The lower surface of the lock arm 56 adjacent the release handle is formed with a plurality of ratchet teeth 60 each of which is extends downwardly from the lock arm 56 a distance substantially equal to that of the spacer elements 52 and 54 as seen in FIG. 5.

Figures 6, 7:
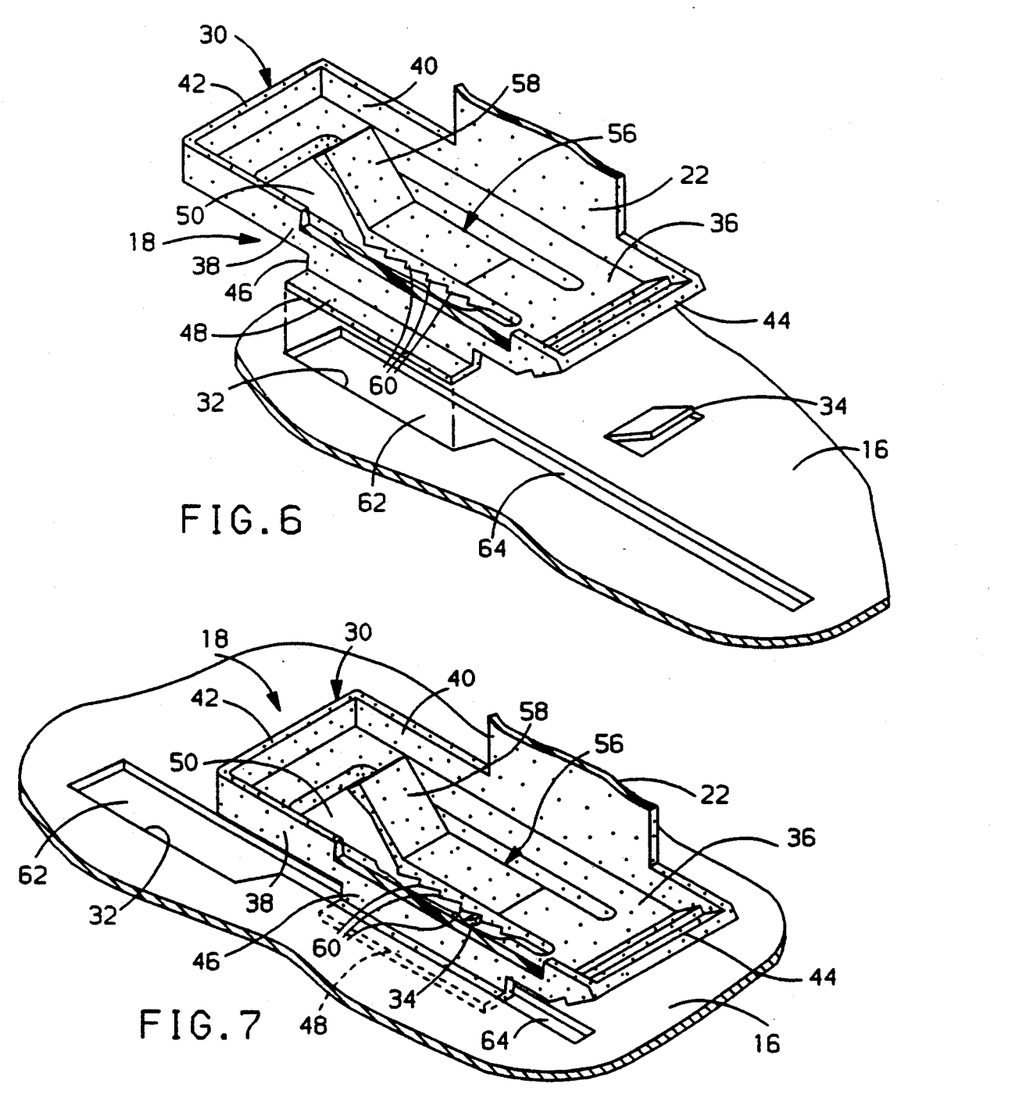
FIG. 6 is a perspective view showing the relative location of the hold-down member and a retainer slot in the support panel prior to having the mounting arrangement fasten the lamp housing to the support panel.
FIG. 7 is a perspective view similar to that seen in FIG. 6 with the lamp housing fastened to the support panel.

As seen in FIGS. 3 and 6, each of the retainer slots 32 comprises an access portion 62 and a retainer portion 64. The access portion 62 consists of a generally rectangular opening having a length dimension and width dimension slightly larger than the length and width dimensions of the contact foot 48 of the insert member formed with the hold-down member 30. The retainer portion 64 of the retainer slot 32 consists of an elongated narrow slit-like opening having a width dimension greater than the thickness of the depending leg 46 of the insert member so as to accommodate the leg 46 when the stop light 14 is in the secured position. The pawl 34 consists of nothing more than a rectangular raised part of the support panel sheet metal as seen in FIGS. 2 and 6 that can be provided by a punch-type tool. The pawl 34 is located inboard of the associated retainer slot 32 ahead of the access portion 62 of the retainer slot 32. The midpoint of the pawl 34 is located a distance substantially equal to the distance from the leg 46 of the insert member to the longitudinal center of the lock arm 56.

As should be apparent, when a pair of mounting arrangements are provided on a stop light as is the case with the present invention, the pair of retainer slots will be spaced from each other a distance which will allow the pair of insert members to be inserted into the access portions of the retainer slots. Thus, when the present stop light 14 is to be secured to the support panel 16, initially the foot 48 of each hold-down member 30 is positioned above the access portion 62 of the retainer slot 32 as seen in FIG. 6 after which the foot 48 is inserted into the access portion 62. This is followed by sliding the stop light 14 bodily in a direction towards the backlite 12 resulting in the ratchet teeth 60 contacting the pawl 34 and, due to the shape of the teeth, allowing the stop light 14 to move in that direction until the bumper member 28 contacts the backlite 12 whereupon the hold-down member 30 assumes the position seen in FIGS. 2 and 7. In this position, the stop light 14 is secured to the support panel 16 and, by reason of having one of the ratchet teeth 60 of the lock arm 56 in engagement with the pawl 34 as seen in FIG. 2 and the foot 48 engaging the underside of the support panel 16 as seen in FIG. 5, the stop light 14 maintains the fixed position seen in FIG. 2 relative to the support panel 16. If for some reason it is desired to remove the stop light 14 from the support panel 16, this can be easily done by merely grasping the release handle 58 and moving it upwardly against the bias of the resilient hinge to release the teeth 60 from engagement with the pawl 34 and, simultaneously, moving the stoplight 14 away from the backlite 12 until the foot 48 of the insert portion is located in the access slot 62 whereupon the lamp housing 22 can be raised and removed from the support panel 16.

FIGS. 8 through 11 show a modified form of the mounting arrangement. In this instance, the hold-down member 66 is made of metal and is a separate member which can be clipped to a flange 68 integral with the lamp housing 70 and located along each side thereof. The lamp housing 70 is intended to be basically the same in construction as the lamp housing 22 shown in FIG. 2 except that the associated flanges 68 are formed as seen in FIGS. 8-11 and have a raised ramp 72 molded therein adjacent a generally rectangular opening 74. Other parts of the flange 68 corresponding to those parts formed with the lamp housing 22 of FIGS. 1-7 are identified by the same reference numerals but primed.

Figure 8:
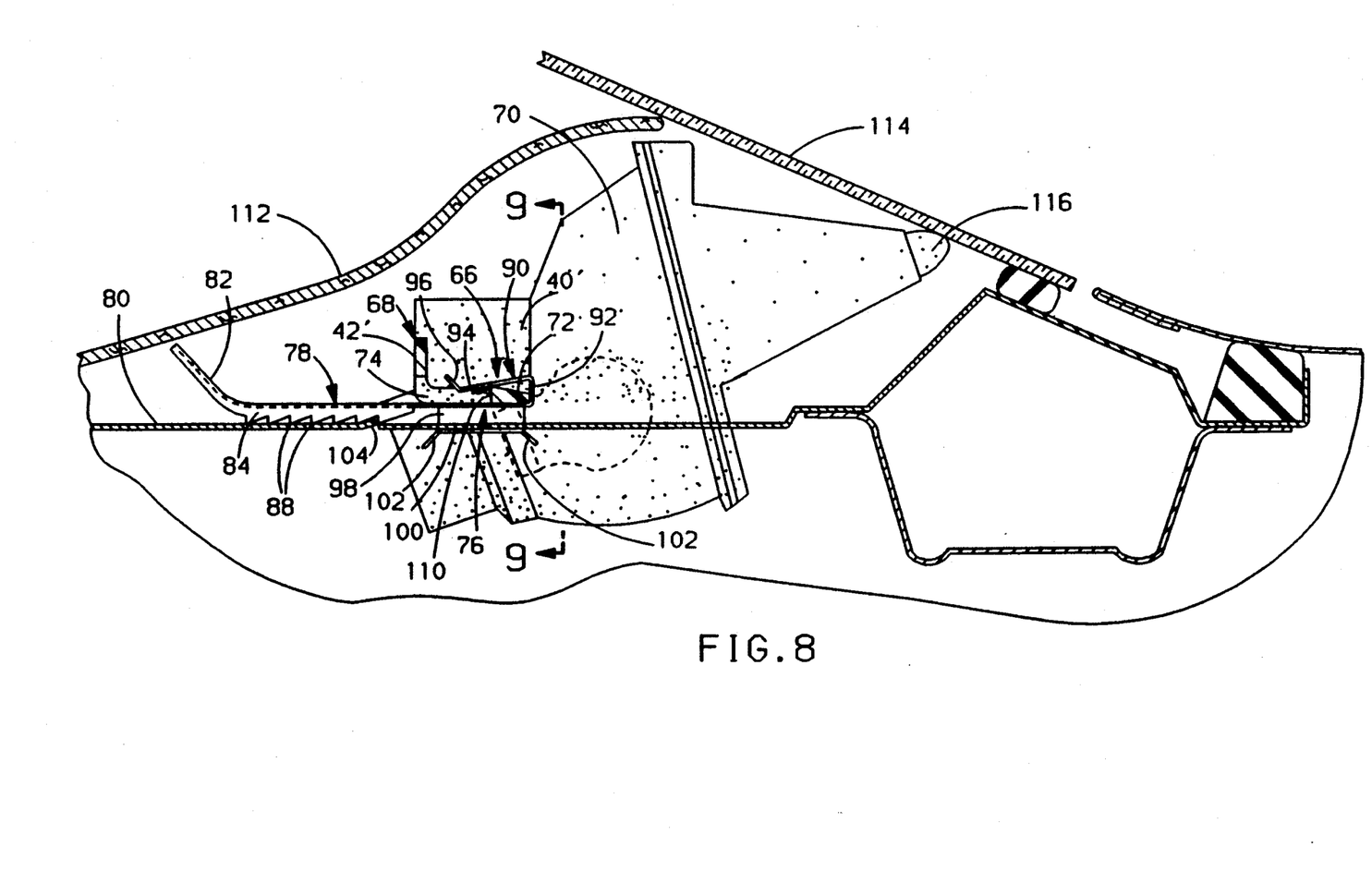
FIG. 8 is a view similar to that shown in FIG. 2, but shows a modified form of the mounting arrangement according to the present invention.
Figure 10:
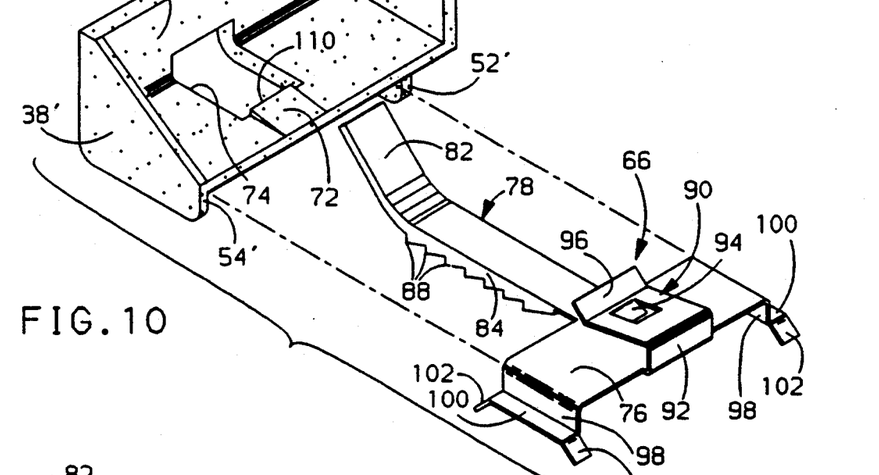
FIG. 10 is a perspective view of the mounting arrangement of FIGS. 8 and 9 showing the hold-down member separated from the lamp housing.

As seen in FIGS. 8 and 10, the hold-down member 66 includes a generally rectangular base 76 integrally formed with a lock arm 78. The lock arm 78 is connected to the base 76 in a manner so as to provide, in effect, a resilient hinge which continuously biases the lock arm 78 towards a support panel 80 for the lamp housing 70 as seen in FIG. 8. The free end of the lock arm 78 is formed with a release handle 82 which extends upwardly. Also, the lock arm 78 formed with a pair of side walls 84 and 86 the lower portion of each of which has a plurality of ratchet teeth 88.

Midway between the outboard ends of the base 76 is a reversely bent spring arm 90 which is integrally connected to the base 76 by an upstanding end wall 92. The spring arm 90 normally extends downwardly towards the base 76 and is formed with a tang 94 which also extends downwardly towards the base 76 but in a direction opposite to the direction of the spring arm 90. The free end of the spring arm 90 is integrally formed with a generally upwardly extending glide member 96.

The two outboard ends of the base 76 are each formed with an insert member that extends downwardly therefrom and comprises a vertically orientated leg 98 and a horizontally laterally outwardly extending contact foot 100. Each longitudinal end portion of each contact foot 100 is formed with a glide member 102 which extends downwardly at an angle relative to the associated contact foot 100.

Figure 9:
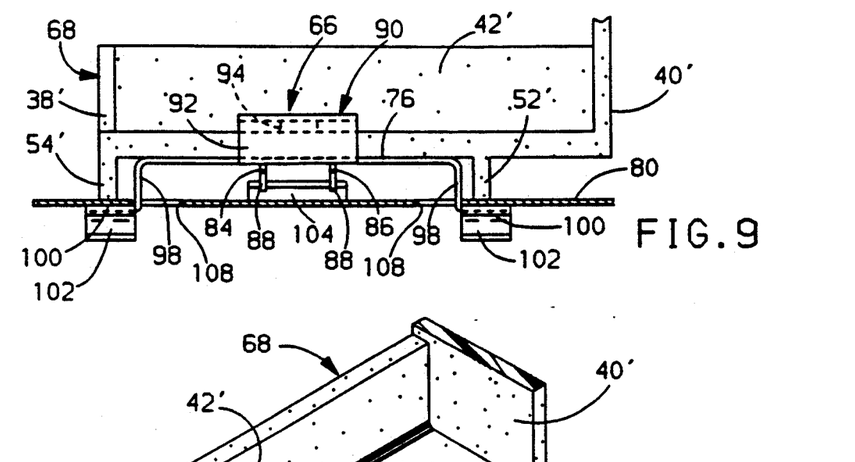
FIG. 9 is a sectional view taken on line 9—9 of FIG. 8.
Figure 11:
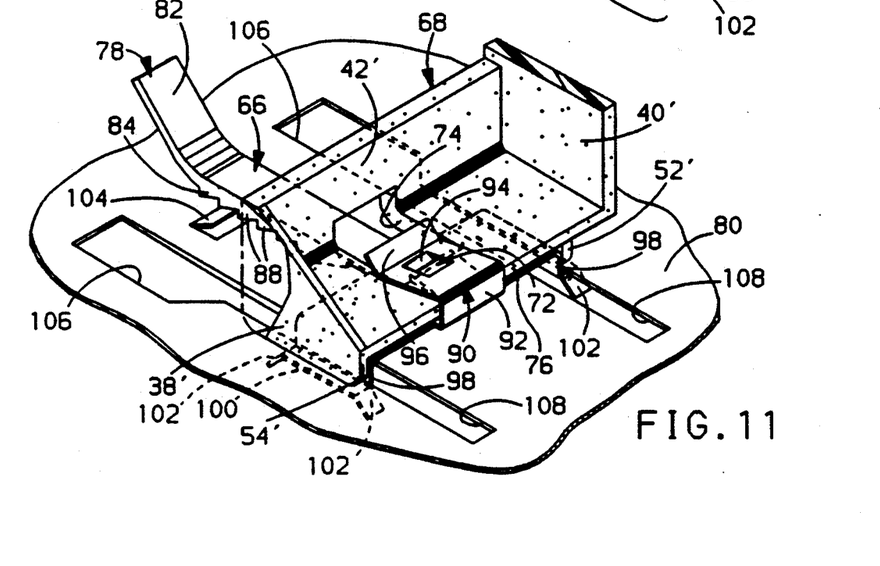
FIG. 11 is a perspective view of the modified mounting arrangement with the hold-down member secured to the lamp housing and located in the retainer slots.

As seen in FIGS. 8, 9 and 11, the pair of insert members of the hold-down member 66 are adapted to be received by a pair of laterally spaced and laterally aligned retainer slots formed in the support panel 80 with a pawl 104 located midway between the retainer slots. Each retainer slot is the mirror image of the other, and has an access portion 106 and a retainer portion 108 which are essentially the same in configuration as the corresponding access portion 62 and retainer portion 64 of the retainer slot seen in FIGS. 1-7 Thus, when the lamp housing 70 is to be secured to the support panel 80, initially the spring arm 90 is aligned with the ramp member 72 of the associated flange 68 as seen in FIG. 10 and moved towards the flange 68 with the glide member 96 contacting the top of the ramp member 72 so that the space between the spring arm 90 and the base 76 receives the flange 68. As the hold-down member 66 is moved to the position seen in FIG. 11, the tang 94 engages the shoulder 110 of the ramp member 72 to secure the hold-down member 66 to the flange 68. The spring arm 90 provides a continuous biasing force towards the flange 68 so that the tang 94 maintains its position and causes the flange 68 to be firmly gripped with a squeezing action provided by the spring arm 90 acting with the base 76 of the hold-down member 66.

As should be apparent, when the hold-down member 66 is secured to the lamp housing 70, the lamp housing 70 is in a condition to be releasably fastened to the support panel 80. In this regard and as in the case of the lamp housing 22 of FIG. 2, the cover 112 will not be present when the lamp housing 70 is being fastened to the support panel 80. Accordingly, the insert members are then vertically aligned with the access portions 106 of the retainer slots and afterwards lowered into the access portions 106. This is followed by sliding the lamp housing 70 bodily towards the backlite 114 resulting in the ratchet teeth 88 contacting the pawl 104 and allowing the lamp housing 70 to move in that direction until the bumper member 116 contacts the backlite 114 whereupon the hold-down member 66 and the lamp housing 70 assume the position seen in FIG. 8. As the lamp housing 70 is moved towards the backlite 114, the glide members 102 make contact with the underside of the support panel 80 followed by the top surface of the contact feet 100 making contact with the underside of the support panel 80 as the feet 100 enter the retainer portions 108 of the retainer slots. Once the bumper 116 contacts the backlite 114, the lamp housing 70 is secured to the support panel 80 and by reason of having one pair or laterally aligned ratchet teeth 88 in engagement with the pawl 104 and the feet 100 engaging the underside of the support panel 80, the lamp housing 70 maintains the fixed position seen in FIG. 8. If for some reason it is desired to remove the lamp housing 70 from the support panel 80, this can be done by merely manually grasping the release handle 82 and moving it upwardly against the bias of the resilient hinge to release the teeth 88 from engagement with the pawl 104 and then moving the lamp housing 70 away from the backlite 114 until the feet 100 of the insert members are in the access portions 106 of the retainer slots whereupon the lamp housing 70 can be removed from the support panel 80.

Figures 12, 13:
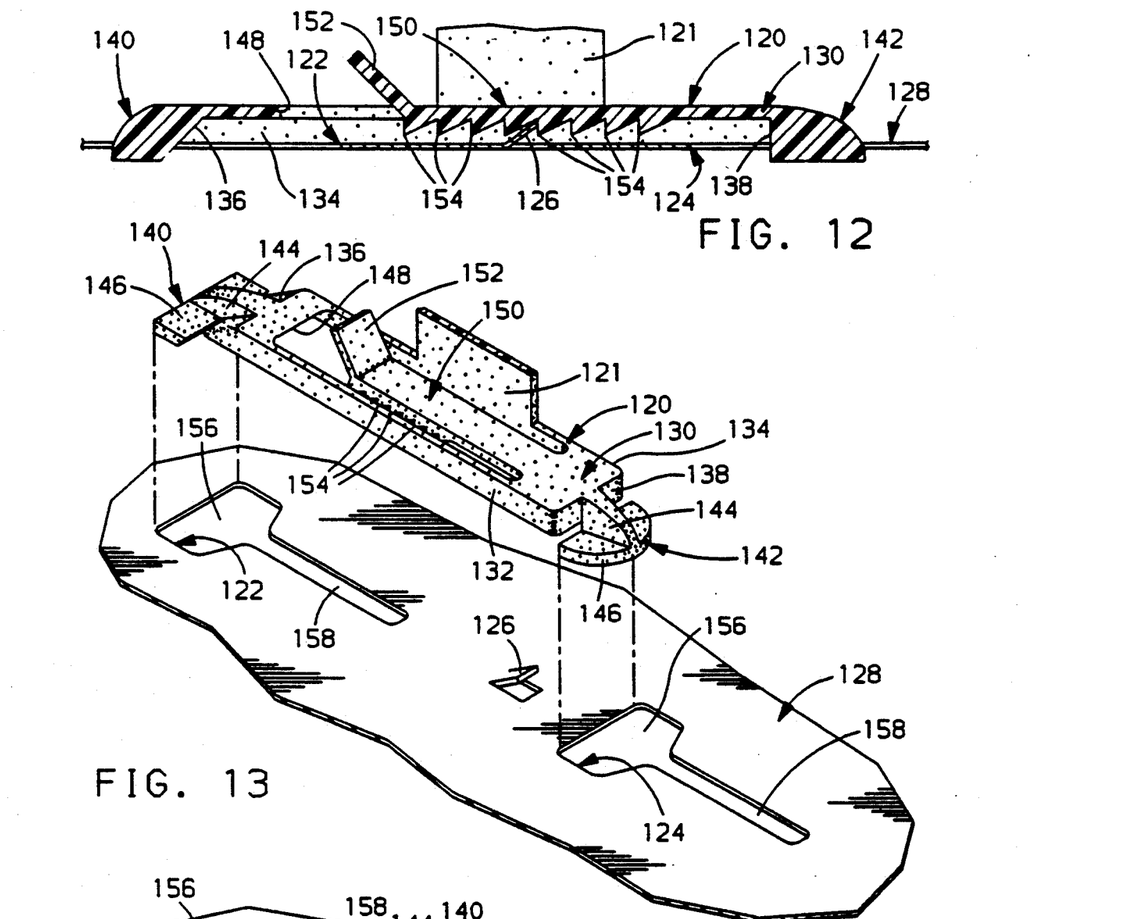
FIG. 12 is a cross-sectional view taken on line 12—12 of FIG. 14 and is similar to that shown in FIG. 4, but shows a further modified form of the mounting arrangement according to the present invention.
FIG. 13 is a perspective view showing the relative location of the hold-down member of the mounting arrangement of FIG. 12 and a retainer slot in a support panel prior to having mounting arrangement fasten the associated lamp housing (not shown) to the support panel.
Figure 14:
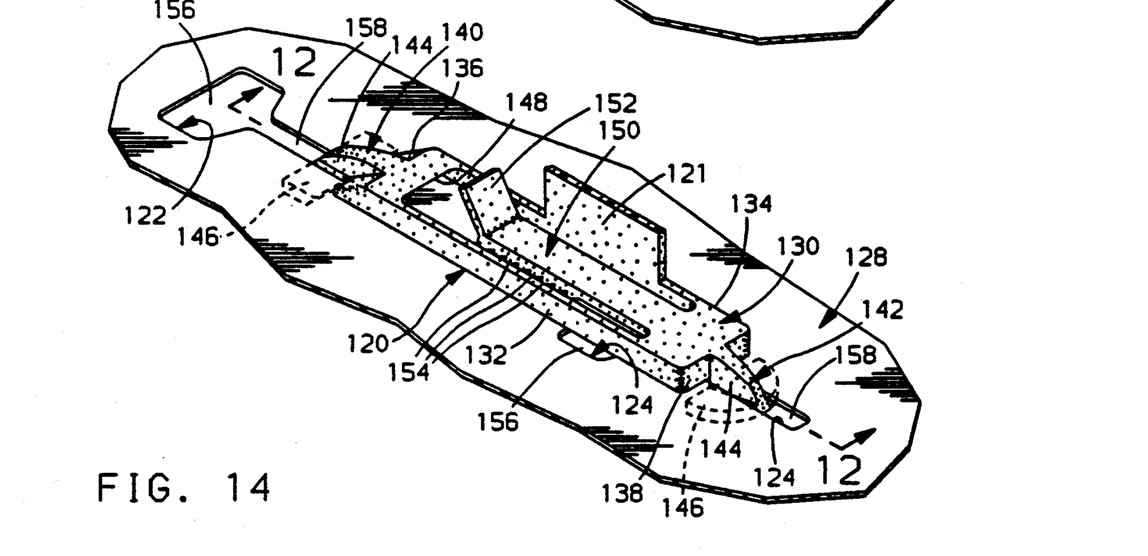
FIG. 14 is a view of the mounting arrangement similar to that seen in FIG. 13 with the hold-down member located in the retainer slot so as to fasten the associated lamp housing to the support panel.

FIGS. 12 through 14 show still another modified form of the mounting arrangement seen in FIGS. 1 through 11. In this modified form of the present invention, the hold-down member 120 is a one-piece integral part of a lamp housing 121 of the type associated with the hold-down members seen in FIGS. 1 through 11, and is adapted to cooperate with a pair of identical retainer slots 122 and 124 and a pawl 126 for fastening the lamp housing to a support panel 128.

More specifically, the hold-down member 120 has a generally rectangular body portion which includes a base 130 formed with a pair of laterally spaced side walls 132 and 134 and a pair of end walls 136 and 138. The end walls 136 and 138 are formed with insert members 140 and 142, respectively, that extend downwardly therefrom. Each insert member 140 and 142 comprises a vertically orientated leg 144 and a horizontally laterally extending contact foot 146. A rectangular opening 148 is provided in the base 130 and a lock arm 150 is positioned in the opening 148 with one end of the lock arm 150 connected to the base 130 in the same manner as the lock arm 56 of the hold-down member 30 seen in FIGS. 1 through 7. In other words, the connection between the lock arm 150 and the base 130 provides a resilient hinge which continuously biases the lock arm 150 towards the support panel 128. The other or free end of the lock arm 150 is formed with a release handle 152 which extends upwardly from the opening 148. The lower surface of the lock arm 150 adjacent the release handle 152 and extending towards the end wall 138 is formed with a plurality of ratchet teeth 154.

As seen in FIG. 13, the retainer slots 122 and 124 are longitudinally aligned and are adapted to receive the insert members 140 and 142, respectively. Each of the retainer slots 122 and 124 comprises an access portion 156 and a retainer portion 158. The access portion 156 consists of a generally rectangular opening having a length dimension and width dimension slightly larger than the length and width dimensions of the contact foot 146 of the insert member 140 that the opening serves to accommodate. On the other hand, the retainer portion 158 of each retainer slot 122 and 124 consists of an elongated narrow slit-like opening have a width dimension greater than the thickness of the depending leg 144 of the insert member that the retainer portion 158 serves to accommodate. As in the case of the prior forms of arrangements made in accordance with the present invention, the pawl 126 consists of a rectangular raised part of the support panel 128 sheet metal. In this instance, however, the pawl 126 is located in axial alignment with the longitudinal center line of the retainer slots 122 and 124.

Thus, it should be apparent that when the lamp housing 121 attached to the hold down member 120 is to be secured to the support panel 128, the contact foot 146 of each of the insert members 140 and 142 is first lowered into the access portions 156 of the retainer slots 122 and 124 as seen in FIG. 13. Afterwards, the lamp housing 121 is manually moved towards the backlite of the vehicle, causing the ratchet teeth 154 to engage the pawl 126 and the contact foot 146 of each insert member 140, 142 to move into the retainer portion 158 of the retainer slots 122 and 124. As described previously, when the bumper member of the lamp housing 121 contacts the backlite, the hold-down member 120 assumes the locked position seen in FIGS. 12 and 14 with one of the ratchet teeth 154 engaging the pawl 126. When it is desired to remove the lamp housing 121 from the support panel 128, the release handle 152 is manually moved upwardly against the bias of the resilient hinge to release the ratchet tooth 154 from engagement with the pawl 126, and the lamp housing 121 is moved away from the backlite until the contact foot 146 is again located in the access portion 156 of the retainer slots 122 and 124, whereupon the lamp housing 121 can be raised and removed from the support panel 128.

Various changes and modifications can be made in the construction of this mounting arrangement without departing from the spirit of the invention. Such changes and modifications are contemplated by the inventors and they do not wish to be limited except by the scope of the appended claims.

The embodiments of the invention in which an exclusive property or privilege is claimed are defined as follows:

1. A mounting arrangement for connecting a lamp housing to a support panel having a slot formed therein, said slot including an access portion and a retainer portion, a pawl formed in said support panel adjacent of the slot, a hold-down member formed with said housing and cooperating with said slot and the pawl for maintaining the lamp housing in a fixed position relative to the support panel, said hold-down member including a body portion fixed with said lamp housing, a lock arm having one end thereof connected to said body portion by a hinge means which biases the lock arm towards the support panel, a plurality of ratchet teeth formed on said lock arm for engagement with the pawl, the other end of the lock arm being formed with a release means for moving the lock arm in a direction away from the support panel for releasing the lock arm from engagement with the pawl, and an insert member connected to said body portion and including a leg depending from said body portion and terminating with a contact foot so as to allow the contact foot of the insert member to be initially inserted through the access portion of said slot after which the lamp housing together with the hold-down member is shifted towards the retainer portion of the slot whereupon the ratchet teeth of the lock arm engage the pawl and the contact foot is located in the retainer portion for cooperation with the underside of the support panel to lock the lamp housing to the support panel.

2. The mounting arrangement of claim 1 wherein said body portion of the hold-down member is made of metal and is a separate member which can be clipped to the lamp housing.

3. The mounting arrangement of claim 1 wherein said body portion includes a pair of insert members cooperating with a pair of retainer slots formed in the support panel for securing the lamp housing to the support panel.

4. The mounting arrangement of claim 3 wherein said pair of retainer slots are located along side of each other.

5. The mounting arrangement of claim 3 wherein said pair of retainer slots are axially aligned.

6. The mounting arrangement of claim 1 wherein the lamp housing is formed with a pair of the hold-down members located on opposite sides of the lamp housing and the support panel is formed with a pair of retainer slots for accommodating the pair of hold-down members.

7. The mounting arrangement of claim 6 wherein each of the pair of hold-down members is formed with a pair of insert members.

8. The mounting arrangement of claim 7 wherein the pair of insert members are axially aligned along a longitudinal axis of the body portion.

9. A mounting arrangement for connecting a lamp housing to a support panel having a slot formed therein, said slot including an access portion and a retainer portion, a pawl formed in said support panel adjacent of the slot, a hold-down member formed with said lamp housing and cooperating with said slot and the pawl for maintaining the lamp housing in a fixed position relative to the support panel, said hold-down member including a body portion fixed with and extending outwardly from said lamp housing and formed with a centrally located opening, a lock arm positioned in said opening with one end thereof connected to said body portion by a hinge means which biases the lock arm in a downward direction, a plurality of ratchet teeth formed on said lock arm for engagement with the pawl, the other end of the lock arm being formed with a release means for moving the lock arm in a direction against the bias of the hinge means for releasing the lock arm from engagement with the pawl, and an insert member connected to said body portion and including a vertically orientated leg depending from said body portion and terminating with a horizontally orientated contact foot so as to allow the contact foot of the insert member to be initially inserted through the access portion of said slot after which the lamp housing together with the hold-down member is moved towards the retainer portion of the slot whereupon the ratchet teeth of the lock arm engage the pawl and the contact foot cooperates with the underside of the support panel to lock the lamp housing to the support panel.

10. A mounting arrangement for connecting a lamp housing to a support panel having an elongated slot formed therein, said slot including an access portion having a large width dimension and a retainer portion having a small width dimension relative to the access portion, a pawl formed in said support panel along side of the slot, a hold-down member formed with said lamp housing and cooperating with said slot and the pawl for maintaining the lamp housing in a fixed position relative to the support panel, said hold-down member including a generally rectangular body portion fixed with and extending laterally outwardly from said lamp housing and formed with a centrally located opening, a lock arm positioned in said opening with one end thereof connected to said body portion by a hinge means which biases the lock arm in a downward direction, a plurality of ratchet teeth formed on said lock arm for engagement with the pawl, the other end of the lock arm being formed with a release means for moving the lock arm in a direction against the bias of the hinge means for releasing the lock arm from engagement with the pawl, and an insert member connected to said body portion and including a vertically orientated leg depending from said body portion and terminating with a horizontally orientated contact foot so as to allow the contact foot of the insert member to be initially inserted through the access portion of said slot after which the lamp housing together with the hold-down member is moved towards the retainer portion of the slot whereupon the ratchet teeth of the lock arm engage the pawl and the contact foot cooperates with the underside of the support panel to lock the lamp housing to the support panel.

* * * * *